Jan. 8, 1952     T. P. DUNCAN, JR     2,582,015
FISHING LURE FOR USE IN CONNECTION WITH HAUL SEINE SYSTEMS
Filed Oct. 7, 1947
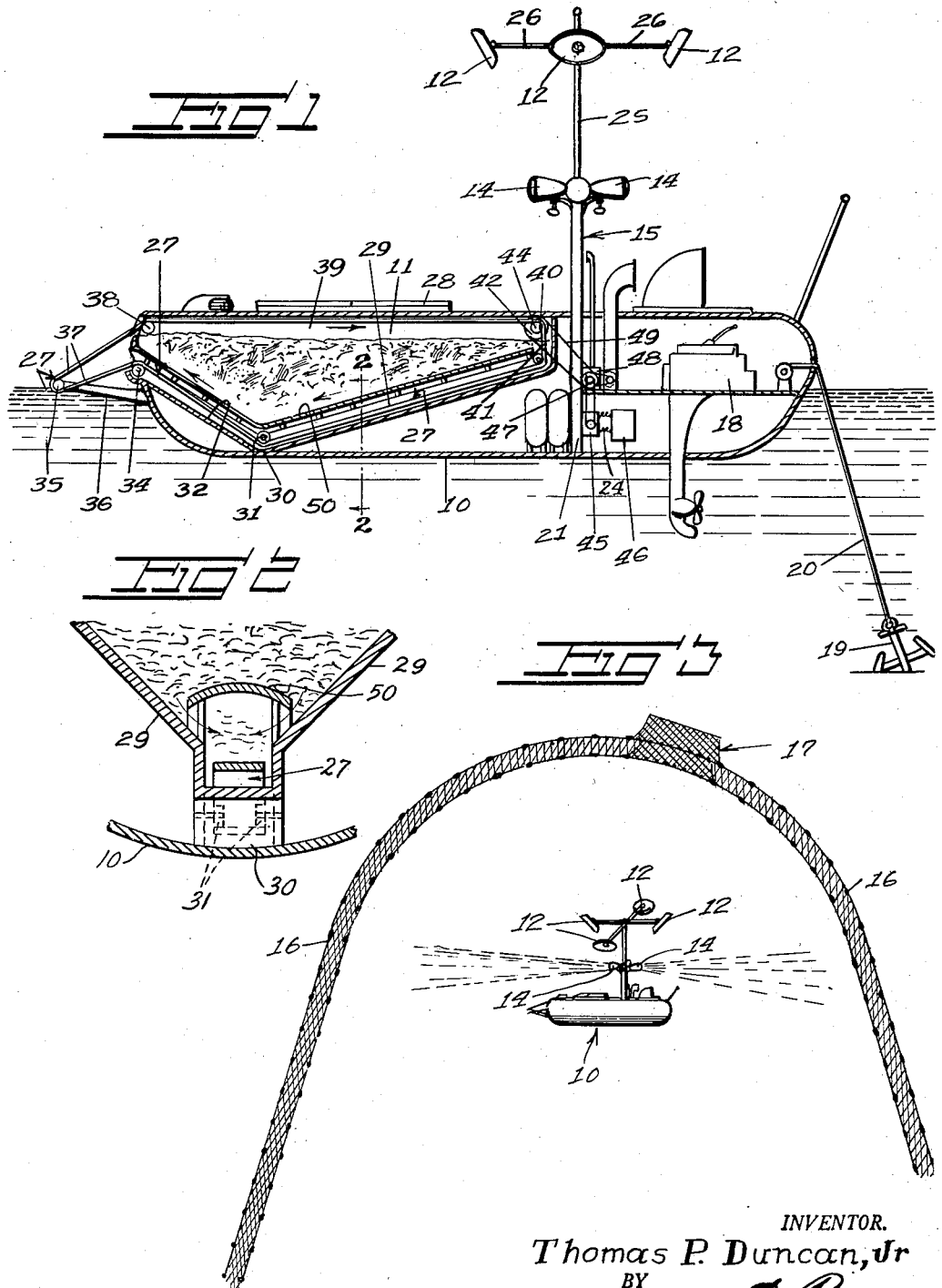
INVENTOR.
Thomas P. Duncan, Jr
BY
Wilfred Lawson
Attorney Patented Jan. 8, 1952

2,582,015

UNITED STATES PATENT OFFICE 2,582,015

FISHING LURE FOR USE IN CONNECTION WITH HAUL SEINE SYSTEMS

Thomas P. Duncan, Jr., Newport News, Va.

Application October 7, 1947, Serial No. 778,387

3 Claims. (Cl. 43—4)

1

This invention relates to a fishing lure for use in a haul seine system.

It is an object of this invention to provide a fishing lure of the kind to be more particularly described hereinafter having lights mounted thereon to provide radial light beams across the water for attracting distant fish within a selected seining area.

Another object of this invention is to provide a device of this kind which is adapted to be floated within the area to be confined by a seine and having mounted thereon lights for attracting the fishes within the seining area, the lights being adjustable vertically relative to the boat or body for adjusting the range of the lure relative to the seine.

Still another object of this invention is to provide a device of this kind having a hopper in which the chum or bait is adapted to be stored and having an endless conveyor for removing the chum from the hopper.

Still another object of this invention is to provide a device of this kind having an endless conveyor for removing the chum from the boat or body for initial disposition on the water within the area to be confined by the haul seine and having an electric operator for the conveyor and vertically adjustable lights for attracting the fish into the seining area, the lights luring by night, the chum luring by day and night.

Still another object of this invention is to provide a device of this kind in which the motive power for the conveyor and the power for the lights, together with the power for locomotion of the device are contained within the body.

With the above and other objects in view, my invention consists in the arrangement, combination and details of construction disclosed in the drawings and specification, and then more particularly pointed out in the appended claims.

In the drawings,

Figure 1 is a view partly in section and partly in side elevation of the buoyant body as herein comprised;

Figure 2 is an enlarged detailed sectional view taken substantially on the line 2—2 of Figure 1 and;

Figure 3 is a diagrammatic view illustrating a method for seining in accordance with the invention.

Referring to the drawings, the numeral 10 designates generally a boat or other hollow buoyant body in which a hopper 11 is formed at one end thereof for storing chum or other fish bait. It is well known that fish are attracted by luminous articles and light, and heretofore it has been proven impractical to use a light system for attracting fish within the limits of a large seine for commercial fishing purposes.

The flood lights 12, beam lights 14, and chum machine 11 are operated over a period of time and then the seine 16 is hauled around this area to trap the fish that have been lured to the area.

The mast 15 has a lower section 21 fixed within the body 10 and an upper or top section 25 of reduced diameter. A plurality of flood lights 12 are carried by the mast 15 adjacent to the upper extremity of the section 25 of the mast. These lights 12 are spaced circumferentially around the mast 15 for throwing light on the seining area about the boat 10 immediately adjacent thereto.

The flood lights are supported by horizontal radially extending supporting arms or bars 26 fixed to the section 25. The flood lights 12 are provided for throwing a large area of light on the surface of the water for attracting the fish upwardly to the surface adjacent the boat or body 10.

The range of such lights is limited due to the wide reflection of the light emanating therefrom so that these lights may not be used for attracting fish from a great distance. The beam lights 14 are provided for surmounting the flood lights 12. The lights 14 are constructed to cast a beam of light at a great distance while covering a limited area.

A hopper 11 or storage chamber is contained in one end of the body or boat 10 within which chum or other suitable fish bait and ice may be stored. It is desired to distribute or dispense the iced chum from the hopper 11 in small portions and this in continuously done by an endless conveyor 27 carried by the body 10 within the hopper 11.

The body 10 is formed on its upper surface with a hatch 28 through which the chum may be admitted into the hopper 11. The hopper 11 is provided with downwardly and rearwardly inclined bottom walls 29 for directing the chum to a low point 30 from which it may be dispensed and discharged by the conveyor 27.

One stretch of the conveyor 27 extends along the length of the downwardly and rearwardly inclined bottom wall 29 to the lowermost point 30 where it is directed upwardly and rearwardly by a pulley or sprocket 31. The upwardly and rearwardly directed stretch 32 of the conveyor 27 extends to the rear end of the body 10 over a pulley or sprocket 34.

Another pulley or sprocket 35 is rotatably supported rearwardly of the body 10 and disposed below the surface of the water behind the boat. The sprocket 35 is rotatably supported on the rear end of a pair of downwardly and rearwardly extending supporting arms 36 fixedly secured to the rear end of the body 10.

One stretch as 37 of the conveyor 27 is trained between the sprockets 34 and 35. The conveyor is returned to the boat 10 by engagement about the sprockets 35 and a pulley or sprocket 38 carried by the rear end of the boat above the sprocket 34.

A horizontal stretch 39 of the conveyor 27 extends along the upper end of the hopper 11 forwardly to a driving pulley or sprocket 40. A downwardly extending vertical stretch 41 completes the length of the endless conveyor 27.

A driving pulley 42 is fixed on the shaft 44 together with the sprocket 40 for actuating the conveyor 27. A motor 45 is provided within the body 10 which is, as shown in the accompanying drawings, in electrical connection as at 24 with a generator 46. A pulley 47 on a shaft extending from the reduction gear box 48 is connected to the driving pulley 42 by a belt 49 for operating the conveyor 27 from the power of the generator and motor.

The generator 46 also provides the energy for the lights 12 and 14. In order to prevent the weight of the ice and chum within the hopper 11 from overloading the conveyor 27 and to provide for the more efficient action thereof, I have provided a U-shaped guard 50 which is supported over the lower stretch of the conveyor on the bottom inclined surface thereof.

The guard 50 is disposed along the entire length of the downwardly and rearwardly inclined stretch of the conveyor, in an inverted position with the lower end of the side edges thereof spaced upwardly from the floor or bottom 29. The bight of the guard extends transversely as a cover over the length of conveyor thereunder. In this manner the chum is supported above the lowermost stretch of the conveyor but is permitted to be disposed thereon by engaging under the lower edges of the guard.

The guard 50 is also provided for covering the upwardly and rearwardly inclined stretch 32.

In the use and operation of this haul seine lure, the body 10 may be driven under its own power by the use of the motor 18 to a desired position within the limits of the seine 16 where it is anchored by the anchor and rope 20.

The beam lights 14 are directed outwardly on the water over a long range and the flood lights 12 are directed downwardly on the surface of the water within a brightly illuminated center of the seining area. In this manner the fish are lured by the light into the area where the seine is to be hauled. The chum within the hopper 11 is continuously dispensed therefrom by the use of the conveyor 27 which deposits the chum as a slick on the water from the stretch 37 which is supported rearwardly of the boat.

I do not mean to confine myself to the exact details of construction herein disclosed but claim all variations falling within the purview of the appended claims.

Having thus described my invention, what I claim is:

1. Apparatus of the character described for luring fish to a prescribed water area, comprising a boat, a hopper within the boat, the wall of the boat having an outlet opening leading from the hopper at an elevation above the water line, an endless conveyor supported to extend lengthwise of the boat, the conveyor having a bottom run passing through the lower part of the hopper and a top run extending over the top of the hopper and the material therein, and a conveyor pulley supported at the water line outside the boat and at a substantial distance from said outlet opening, and said conveyor having the bottom run passing through said outlet opening to and around said pulley.

2. An apparatus of the character stated in claim 1, in which the hopper has inclined side walls terminating in spaced relation at their bottom edges, the space between the bottom edges of the walls of the hopper extending lengthwise of the boat, a hood extending lengthwise of the space between the said edges of the side walls of the hopper and spaced from such walls, and the said bottom run of the endless conveyor passing along the space between the said bottom edges of the side walls of the hopper beneath said hood.

3. Apparatus of the character stated in claim 1, wherein the said endless conveyor pulley is supported between a pair of arms carried by the boat and extending outwardly therefrom, the pulley being rotatably mounted between the outer ends of the arms.

THOMAS P. DUNCAN, Jr.

REFERENCES CITED

The following references are of record in the file of this patent:

UNITED STATES PATENTS

| Number | Name | Date |
| --- | --- | --- |
| 369,022 | Morgan et al. | Aug. 30, 1887 |
| 430,238 | Schenck | June 17, 1890 |
| 455,758 | Moulsong | July 14, 1891 |
| 625,086 | Conley | May 16, 1899 |
| 651,931 | Peck | June 19, 1900 |
| 848,101 | Hale | Mar. 26, 1907 |
| 858,180 | Hetzel | June 25, 1907 |
| 1,152,371 | Meyer | Aug. 31, 1915 |
| 1,164,415 | Simmons et al. | Dec. 14, 1915 |
| 1,467,763 | Lybeck | Sept. 11, 1923 |
| 1,787,025 | Stinson | Dec. 30, 1930 |

FOREIGN PATENTS

| Number | Country | Date |
| --- | --- | --- |
| 40,735 | Sweden | Mar. 31, 1916 |